United States Patent
Scott et al.

(10) Patent No.: US 6,360,518 B1
(45) Date of Patent: Mar. 26, 2002

(54) AUTOMATICALLY ADJUSTING SHAKER HEAD HARVESTER WITH STEERING CORRECTION AND IMPROVED SHAKER HEAD MOUNTING

(76) Inventors: Phillip R. Scott, 29846 Corral Ct. North, Coarsegold, CA (US) 93614; Franklin P. Orlando, 14625 Country La., Morgan Hill, CA (US) 95037; Kevin M. Caine, 1813 W. Donner, Fresno, CA (US) 93705; Marty D. Youman, 36758 Orange Grove Ave., Madera, CA (US) 03638

( * ) Notice: Subject to any disclaimer, the term of this patent is extended or adjusted under 35 U.S.C. 154(b) by 0 days.

(21) Appl. No.: 09/535,360

(22) Filed: Mar. 24, 2000

(51) Int. Cl.7 ................................................ A01D 46/24
(52) U.S. Cl. ................ 56/328.1; 180/435; 24/274 WB; 24/278
(58) Field of Search ............................... 56/328.1, 329, 56/340.1; 180/434, 435, 436; 248/231.41, 231.61; 24/274 WB, 278

(56) References Cited

U.S. PATENT DOCUMENTS

| | | | |
|---|---|---|---|
| 3,972,381 A | * | 8/1976 | Gail |
| 3,979,891 A | * | 9/1976 | Patton |
| 4,286,426 A | | 9/1981 | Orlando et al. ................ 56/330 |
| 4,418,780 A | * | 12/1983 | Ito et al. |
| 4,621,488 A | | 11/1986 | Claxton ......................... 56/330 |
| 4,860,529 A | | 8/1989 | Peterson et al. ............... 56/330 |
| 5,067,314 A | | 11/1991 | Burke .......................... 56/330 |
| 5,074,108 A | | 12/1991 | Claxton et al. ............... 56/330 |
| 5,307,611 A | * | 5/1994 | Vardeman et al. |
| 5,423,166 A | | 6/1995 | Scott ........................... 56/330 |
| 5,661,963 A | | 9/1997 | Scott ......................... 56/328.1 |
| 5,904,034 A | | 5/1999 | Youman .................... 56/328.1 |
| 5,908,352 A | * | 6/1999 | Meester et al. |
| 5,996,722 A | * | 12/1999 | Price |
| 6,178,730 B1 | * | 1/2001 | Visser |

* cited by examiner

Primary Examiner—H. Shackelford
(74) Attorney, Agent, or Firm—Douglas W. Rudy

(57) ABSTRACT

A harvester incorporating at least one force balanced shaker vibratory brush as the harvesting apparatus uses a sensing system connected to a plurality of spring feelers carried on a shaft to generate a torque value responsive to the location of the shape and position of a tree. The feeler springs may be of differing lengths to assist in tuning the harvester. Apparatus and a method for mounting the shaker head on the vehicle as well as system of steering the harvester are disclosed.

34 Claims, 11 Drawing Sheets

AUTOMATICALLY ADJUSTING SHAKER HEAD HARVESTER WITH STEERING CORRECTION AND IMPROVED SHAKER HEAD MOUNTING

BACKGROUND OF THE INVENTION

I. Field of the Invention

This invention concerns an automatically adjusting, tree contour tracking, force-balanced shaker brush harvester apparatus for removing fruit from a tree, bush or plant, and methods of harvesting the fruit, controlling the position of the shaker heads and mounting the shaker brushes in the harvester. This invention also includes a mechanism for an automatic control system for the directional control of the steerable wheels of the harvester.

The particular harvester of this invention is a type that straddles a row of crop, for instance, a row of olive trees in an orchard. It is know as an "over-the-row" harvester. It has an elevated frame supported on four wheels and enough width between the wheels to accommodate the orchard trees. For an orchard harvester the supporting frame may be more than eight feet off the ground to allow the harvester to straddle a tree that is wide and tall. The harvester includes substantially vertical shaker brushes having rod or tines that are positioned into the branches of the tree to induce a vibration in the tree. This causes the fruit to be shaken off the tree.

The vibration is generated by a force-balanced drive for each shaker head.

In a particular embodiment of this invention, the automatically adjusting shaker, harvester or the like has a series of leaf springs cantilevered from a central pivot to act as tree contour sensing feelers. The feelers are mounted to a support collar and clamped to a shaft. Their position is adjustable horizontally, vertically, and in length—by replacing a first leaf spring of one length with a second leaf spring of a different length—, to profile the general tree, bush or plant shape, e.g. a conical shaped tree profile. The feelers are adjustable depending on the tree, bush or plant shape profile. For example, the tree profile may comprise more of a vertical hedgerow shape without gaps between the trees. In this situation the length of the feelers may be adjusted. That is, at least some of the feelers are adjusted to be shorter than they would be when set up for picking from a conical shaped tree.

An electrical rotation sensor, such as a potentiometer or alternatively, a linear sensor, is coupled with the shaft that supports the springs or feelers. The sensor detects movement of the springs (also referred to as "feelers," "spring feelers," "feeler springs") carried on the shaft that causes a signal to be sent to a controller. The controller in turn causes a proportional valve to reposition the shaker brush, moving the shaker brush inwardly or more outwardly as needed. The repositioning of the shaker brush drives a potentiometer error signal toward zero, which thus establishes a new equilibrium point between the potentiometer sensing feeler spring supporting shaft position and shaker brush position. This allows for adjustment of the shaker depending on the shape of the tree.

A "time-out" feature is used to shut off hydraulic pressure to the actuator that moves the shaker brush in and out when a constant retract error occurs for more than a set time, e.g. ten seconds. A constant retract (of the shaker brush) condition will occur when the harvester is at the end of a tree row, if there are large distances between trees, or if the harvester is stationary between trees, for instance. When the harvester is at an end of a row the new course taken by the harvester will be void of trees and therefore no sensing is needed. Thus, the spring feelers will, through the sensor carried on the shaft, indicate a "too wide" spacing error between opposed sets of shaker brushes and attempt to retract the shaker head until the error disappears.

After the harvester completes its turn or otherwise starts down the orchard row the error signal will disappear as the spring feeler host shaft will rotate in response to the feeler springs contacting the tree.

The attendant potentiometer will provide an output to the controller. The on board tree sensing and shaker brush adjusting control system will process the output and cause an associated brush actuator, a hydraulic ram, to reposition the shaker brush relative to the sensed tree. The control signal will thus have changed from "retract" to "extend" and the shaker brush will be repositioned accordingly.

For normal travel within the operational parameters of the placement in the orchard, a limit switch or alternatively, a mechanical stop, may be implemented to interrupt a retract signal. The retract signal, overridden by the limit switch, will position the shaker head at a preset position to prevent the shaker head from fully retracting.

Moreover, when the harvester is in a transport mode, where no trees, bushes or plants are to be engaged, the operator can override the limit switch or alternatively override the mechanical stop. Thus, the shaker brushes will remain fully retracted. This results in minimization of the width dimension of the harvester allowing for travel that is more efficient.

The shaker brush position, which is normally controlled during the harvesting operation by the electronic control system, i.e. the controller, operating various hydraulic valve circuits of the harvester, can also be controllable by the harvester operator. He can manually switch the shaker brush control from an "auto" mode to a "jog" mode. In the jog mode, the operator of the harvester can use a jog switch to move and hold each individual shaker brush at a desired position within a range of parameters.

This invention also concerns an automatic steering correction system for a harvester. It is usual to have a harvester equipped with a pair of rail sensors affiliated with a pair of front guide rails. A second pair of rail sensors, located at the rear of the harvester vehicle, is used in this invention to indicate the position of the back end of the harvester. The harvester operator is alerted when the rear wheels are being steered automatically by the control system with indicator lights in the cab of the vehicle. Such automatic steering will happen when the rear guide rail sensors send a signal to the controller that the harvester is not tracking the tree row evenly. Alternatively, the vehicle itself can be programmed to react to an unusual steering situation by an input to a manual input device, for instance, a keyboard input device, that can be used to program the automatic control system. In essence, there is a semi-automatic operation where the operator receives sensory input from the system or fully automatic steering where steering corrections are made automatically without operator control.

II. Description of Related Information

In one style of harvesting, it is known to remove fruit, such as grapes, nuts, citrus fruit and olives, from vines or trees using a shaker brush powered by a force balanced shaker. Present machines travel down one side of a row of trees and harvest olives from that side of the trees. A more complex type of harvester, an "over-the-row" machine, straddles the tree or vines. The profile of the tree is generally conical in shape with appropriate spacing between the trees to allow for the harvesters, tree trimmers, and workers, to complete the work necessary to harvest the crop and maintain optimum health of the trees.

To pick the olives effectively, it is necessary to move the shaker head, in a single head unit that harvests from one side of the tree at a time, or in an over-the-row harvester where two opposed shaker heads are used, toward and away from a tree row centerline to properly engage shaker rods or tines (which make up tree contacting elements of the "shaker brushes") with the tree as the harvester travels along the row. The trees have what may be termed a front side, that portion of the tree on the side being approached by the harvester shaker and a back side of the tree on the side of the tree away from the approaching harvester. Good shaker contact with the side of the tree is easy. Good shaking contact with the front and the backside of the tree is more difficult. To accomplish harvesting with the shakers known in the art, more typically, harvesters that have only one shaker brush and harvest from the side, the shaker positioning is manually controlled. Starting between trees, the shaker is moved inward at the front side of the tree toward the tree row centerline. As the leading side of the shaker engages the tree it must be rapidly pulled outward away from the tree centerline as the harvester machine travels forward to move around the side of the tree. Then, the trailing side of the shaker must be moved rapidly from engagement with the side of the tree inwardly towards the tree centerline to engage the backside of the tree. The high forces imparted by the shaker engaging the tree results in olives flying off the tree in an directions as the tree is shaken. As a result, the person controlling the position of the shaker must look through a protective screen in order to avoid being struck by olives. The screen results in diminished visibility of the person controlling the position of the shakers while observing the tree, the olives, and the moving shakers. In short, it is physically and mentally taxing on the operator to reposition the shaker head for optimum fruit removal and minimum tree damage.

Various patents pertaining to harvesters are know to the inventors. U.S. Pat. No. 5,904,034 discloses a machine that has a hydraulic cylinder to bias a picking head to contact the trees. One deficiency in this design is that if the harvester is not on level ground the brush will be urged by gravity either in toward the tree thereby generating too much force on the tree or, depending on the slope of the ground, away from the tree and thereby not getting the contact with the tree that yields optimum harvesting. The biasing cylinder must be set to a low enough pressure to avoid excessive penetration of the tree by the rods. In this patent there are no sensors for sensing the tree and then automatically adjusting the position of the shaker head relative to the tree.

It is also known to use rods on a shaker head to harvest fruit. In U.S. Pat. No. 4,860,529 no sensors are used to sense the position of the tree relative to the shaker head.

It is also known to use a shaker head including a force-balanced shaker with the shaker head movable to approach at least three sides of a tree. No sensor springs are disclosed in U.S. Pat. No. 5,661,963, and there is no feed back system for automatically adjusting the depth of shaker rod penetration into the tree.

It is also known to provide a harvester that has multiple shaker heads on a single chassis. In U.S. Pat. No. 5,423,166, there is no provision for automatic positioning of a shaker head responsive to feeler springs associated with the shaker heads.

It is also known to provide an over-the-top harvester as shown in U.S. Pat. No. 5,067,314. No sensor responsive device depending on feeler springs is taught by this patent.

Each of the above mentioned patents are hereby incorporated by reference. None of these above mentioned patents disclose a system and method for harvesting using shaker brushes that are sensor responsive using feeler springs as is disclosed herein.

A problem relating to the manual positioning of shakers is the number of workers required in moving the shakers in and out of position during operation of such a harvester. Increased operating cost is reflected in such harvesting systems because as more workers are needed to operate the machinery higher operating costs accrue.

Also a problem is the decreased fruit removal rates observed in a manual operation of a force balanced shaker harvester.

In one embodiment of this invention, an automatic steering system is incorporated in the harvester. In prior art harvesters an automatic steering system using a guide wire, grapevine trunk, curb edge, or visual feedback are used. For example, one way to steer a harvester is to use side rails that sense relative tree trunk side-to-side position and automatically direct hydraulic oil to a steering cylinder to drive an error signal towards zero to steer front wheels of the harvester.

Problems relating to steering a harvester apparatus caused by the relatively long wheelbase of the harvester need to be overcome. A wheelbase of approximately two hundred fifty inches in combination with a requirement to turn the harvester within a thirty-foot radius, the maneuvering space at the beginning and end of each tree row, creates maneuverability issues for the harvester. To accomplish efficient turning movements in this invention, both front and rear wheels are steerable wheels. For example, for a left turn, the front wheels turn left while the rear wheels turn a corresponding amount to the right. This causes the harvester to turn about a centerline located along a line perpendicular to the travel and approximately halfway between the front and rear wheels. An operator positioned at the operator's station at the front of the harvester cannot judge the harvesters trailing position. Thus, if the operator sharply turns at the end or beginning of a row, the harvester rear will swing out and not line up with the tree row centered under the straddling harvester. Therefore, damage to the tree and/or machine will likely occur. If the operator selects to steer with only the front wheels, the rear wheels will "cut over," that is not track with the front wheels, with the same result (but usually on a smaller diameter of the turn) as above.

Another problem addressed by this invention concern access to the force balanced drive device. A new mounting technique is included in this invention wherein a collar supports the shaker brush below the force-balanced drive. This means that access to the drive is possible without having to remove the shaker brush or its substantial mounting hardware. Previously, that is in earlier designs, the support for the shaker brush was above the drive unit. This blocked access to the force balanced shaker unless the shaker brush support was first removed.

SUMMARY OF THE INVENTION

The present invention provides a harvester apparatus for removing fruit from a tree, bush or plant, which comprises a shaker brush carried by the harvester. The shaker brush is capable of being automatically moved to alternative positions relative to the tree, bush or plant. Movement of the shaker brush or brushes is responsive to inputs from tree contacting springs or feelers that determine the presence of a tree and the trees shape. The present invention also provides a system for steering the harvester by providing a pair of rail sensors to indicate the rear position of the harvester. This invention also includes a mounting arrangement to mount a shaker brush driven by a force balanced shaker, in a way that does not block access to the force balanced drive unit.

The harvester performs a series of acts for removing fruit from a tree, bush or plant, which includes the steps of: a) providing a shaker brush that will contact the tree; b) providing a system of feeler springs to sense the presence of a tree; c) computing sensory input information generated in response to contact between the tree and the feeler springs; d) automatically moving the shaker brush relative to the tree and the harvester to accommodate the contour of the tree responsive to the sensory input information.

In another embodiment of the invention, a system for steering a harvester includes a pair of rail sensors used to independently indicate rear position of the vehicle. The position of the rear wheels or the position of the back of the vehicle, can be conveyed to the operator by either alerting him with error lights to indicate which way he should turn or as input to an automatic control system, controlling a hydraulic circuit, for the rear wheels which controls rear wheel steering.

It is an object of this invention to provide a sensor input to a control circuit to automatically adjust the position of the harvester brushes.

It is another object of this invention to have a sensor input responsive to feeler springs that will contact fruit trees.

It is a further object to require the input of a predetermined torque force from sensors before shaker brush position is affected.

It is also an object of this invention to provide limit restraints on the scope of movement of the shaker brushes.

An object of the invention is to provide rear rail sensors used to independently indicate, and to steer, the back end of the harvester.

It is also an object of this invention to provide a four-wheel steering device that keeps the harvester rear end aligned with the front wheels of the harvester and more importantly with the tree row.

One more object and advantage of this invention is that a smaller operating crew is needed to operate the harvester disclose here. In prior units, the main operator's work responsibilities are multiplied as he/she monitors one or more additional operators/workers performing the task of positioning the shakers. It is an object of this invention to eliminating one operator for a single side harvesting machine or two operators for an over-the-row harvesting machine by implementation of a machine having the control system disclosed herein. Elimination of extra operators/workers results in inherent improvement in increased fruit removal production and reduction in harvesting cost.

Another advantage of this invention over the conventional machine is that the potential for damage to the tree and harvesting machine from "over engagement" of the harvester with the tree is eliminated.

It is another object of this invention to provide a mounting technique for mounting the shaker brush to the shaker brush frame. In prior devices, the shaker brush mounting included a substantial element above the force balanced shaker drive mechanism at the top of the shaker brush. It is an object of this invention to make access to the force balanced shaker easier.

It is also an object of this invention to provide a support for a shaker brush along the shaker brush central shaft.

The preferred embodiments of the invention presented here are described below in the drawing figures and Detailed Description of the Drawings. Unless specifically noted, it is intended that the words and phrases in the specification and the claims be given the ordinary and accustomed meaning to those of ordinary skill in the applicable arts. If any other special meaning is intended for any word or phrase, the specification will clearly state and define the special meaning.

Likewise, the use of the words "function" or "means" in the Detailed Description of the Drawings is not intended to indicate a desire to invoke the special provisions of 35 U.S.C. 112, Paragraph 6, to define the invention. To the contrary, if the provisions of 35 U.S.C. 112, Paragraph 6 are sought to be invoked to define the inventions, the claims will specifically state the phrases "means for" or "step for" and a function, without also reciting in such phrases any structure, material or act in support of the function. Even when the claims recite a "means for" or "step for" performing a function, if they also recite any structure, material or acts in support of that means or step, then the intention is not to invoke the provisions of 35 U.S.C. 112, Paragraph 6. Moreover, even if the provisions of 35 U.S.C. 112, Paragraph 6 are invoked to define the inventions, it is intended that the inventions not be limited only to the specific structure, material or acts that are described in the preferred embodiments, but in addition, include any and all structures, materials or acts that perform the claimed function, along with any and all known or later-developed equivalent structures, material or acts for performing the claimed function.

BRIEF DESCRIPTION OF THE DRAWING FIGURES

The preferred embodiments, characteristics and benefits of the present invention can be more easily understood from the following description of the preferred, and alternative embodiments, in combination with the drawing figures, in which.

DETAILED DESCRIPTION OF THE DRAWINGS

The invention is an improved harvester for harvesting fruit and other harvestable commodities growing in orchards or in other tended growing situations, configurations and environments. An example of a particular embodiment is a harvester for the harvesting of olives from olive trees. The invention will be described in the context of an olive harvester but the inventors intend, and it should be recognized, that the invention pertains to similar harvesters, such as, but not limited to, grape, raisin, citrus, coffee, nut harvesters and the like. That is, the disclosed harvester can be used for harvesting crops other than olives and other harvesting scenarios incorporating the features of this invention are contemplated as being within the scope of this disclosure.

Figure 1:
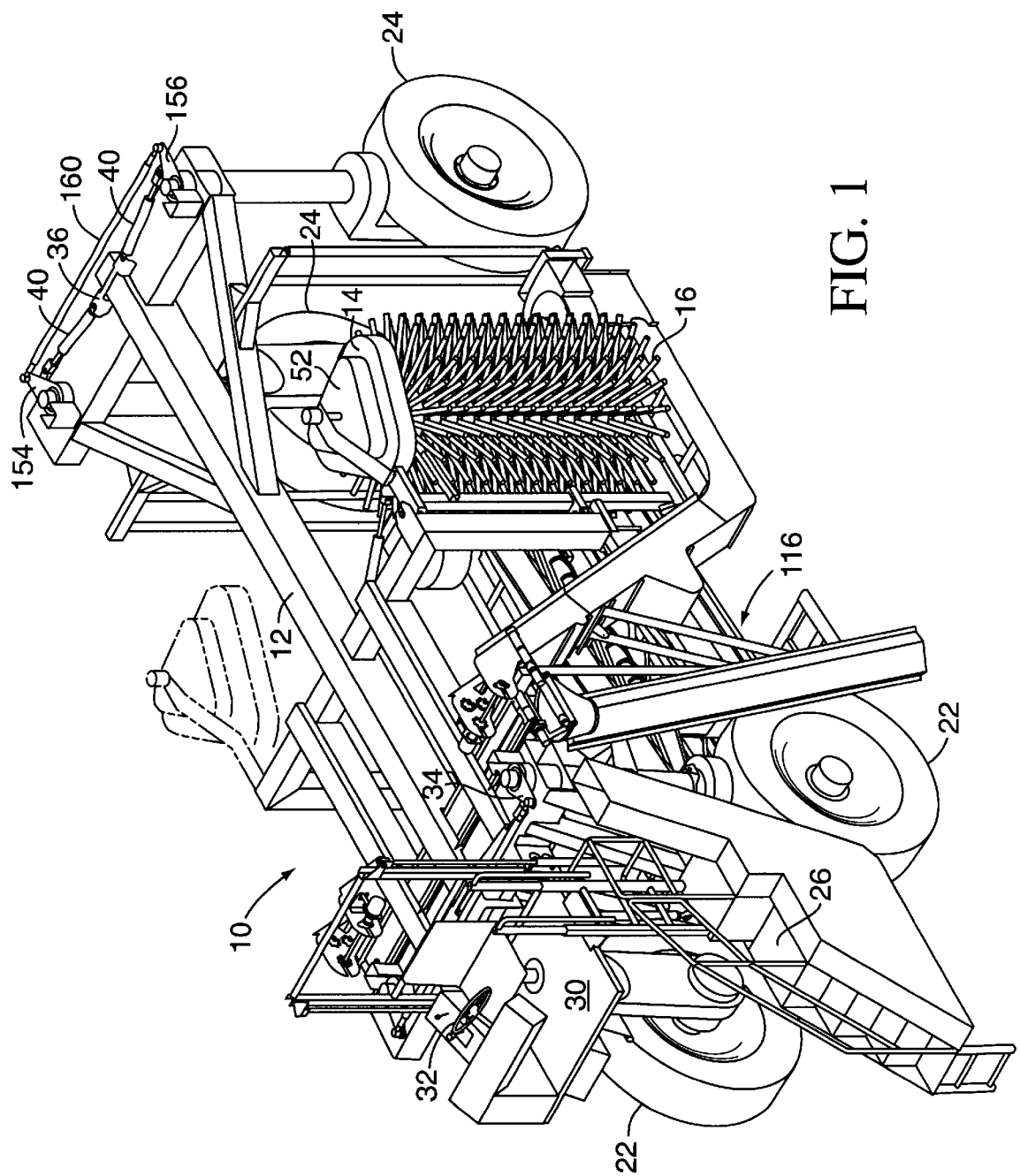
FIG. 1 is an overhead side angle view of an apparatus for harvesting fruit, e.g. olives, from a tree, bush or plant of the invention.

The harvester shown in FIG. 1 is a type that straddles the row of olive trees. That is, the harvester is driven over the row of trees to be harvested with the main frame of the harvester supported high above the ground on wheels. The harvester frame can be moved vertically by hydraulic rams to provide drive over clearance when harvesting. This particular configuration is used in harvesters such as grape harvesters and the configuration can be used for olives as well as other crops if the host harvester frame is properly configured.

In FIG. 1, an olive harvester is shown as generally 10. The harvester includes a frame 12 and at least one shaker element such as 14.

In one embodiment of the invention, two shaker brushes 14 are carried on the harvester frame 12. The shaker heads 14 are automatically movable to an extended position, meaning swung out away from the centerline of the vehicle and away from the canopy of the olive trees. The terms "extending" and "retracting" used in this disclosure correspond to the "extended" or "retracted" displacement of a pivoting cylinder that is used to move the shaker elements 14. The shaker brushes 14 are also retractable to a position relative to a centerline of the tree, bush or plant (not illustrated). The partially extended position of the shaker brush 14 is shown in FIG. 1.

Figure 2:
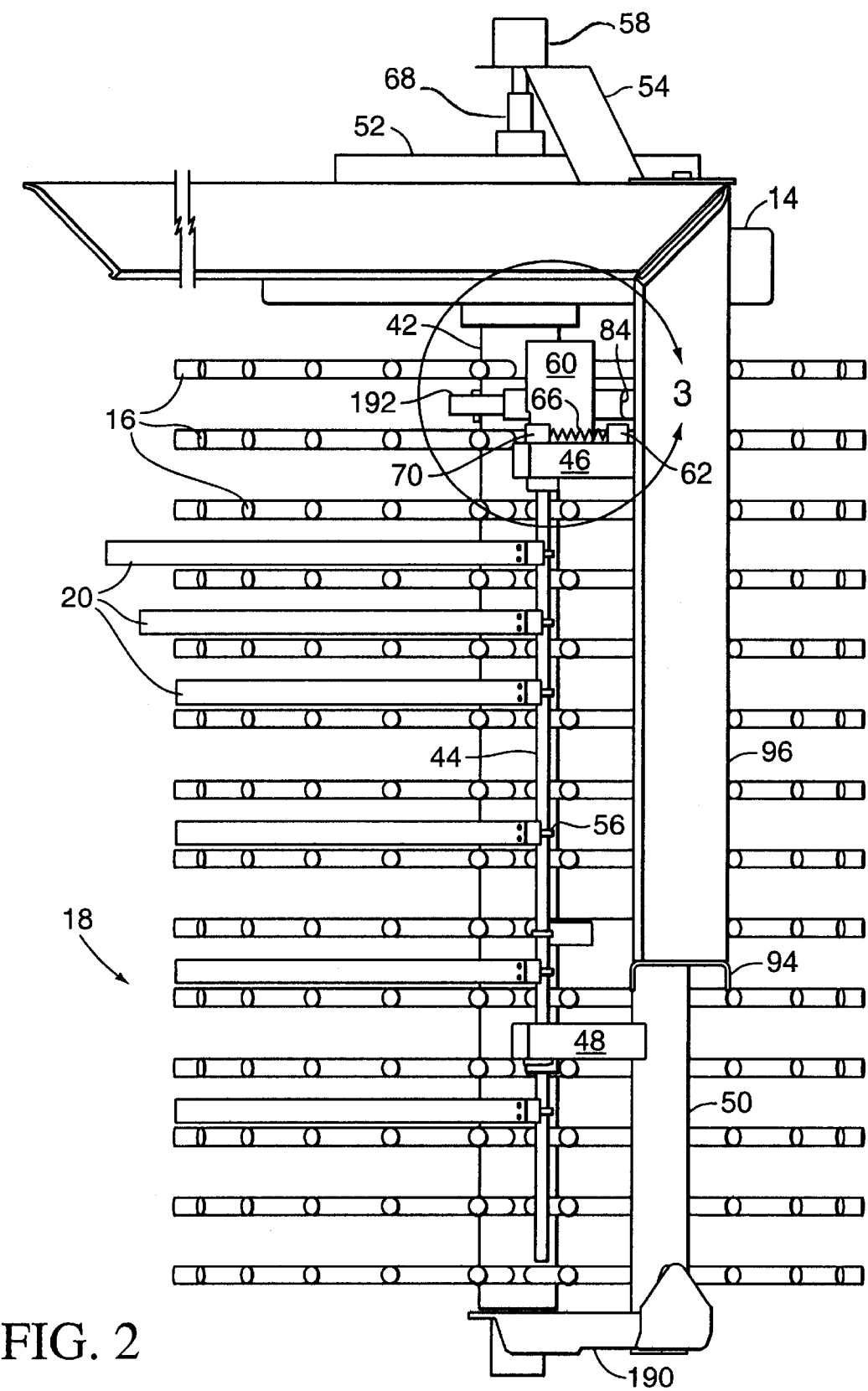
FIG. 2 is a sectional view of the harvester shaker element of FIG. 1, taken along 2—2.

The harvester 10 includes a data acquisition system and a control system that, in its simplest form, averages tree contour dimensions at various locations on the tree to provide for optimum shaker 14 engagement with the tree. The rods or tines 16 of the shaker brush penetrate into the canopy of the tree an optimum amount, not too deep and not too shallow, to effectuate good picking performance without damage to the tree. Once the data from the tree contacting feeler springs, such as 20 in FIG. 2, is processed by the control system the harvester 10 automatically adjusts shaker 14 position—extended or retracted—to follow the tree profile contour as the harvester 10 moves down a row of trees.

The control system also senses, via an electrical rotation sensor, when the shaker heads 14 have been retracted for a preset period of time and automatically shuts off the control system to prevent system attempts to continue to retract the shaker heads against stops.

The harvester and the control system for the shakers allow for two harvesting modes of operation of the shaker brushes 14. These include: 1) an automatic mode; and 2) a manual "jog" mode. In the automatic mode, the control of the brushes is from "full out", this is a fully extended position to accept the widest trees, to a preset travel stop position. The stop setting or position is set by the operator to limit the inward movement of the shaker head so that it does not travel to the fully retracted position. In situations where road travel, or other travel, is planned, the stop limit will be disengaged. This allows full inward or retracted brush position during travel to minimize width of the vehicle.

As discussed further on in this specification, the control system of the harvester 10 includes a steering control system that automatically compensates for the harvester being driven off a centerline of a row of trees.

Returning to FIG. 1, the harvester 10 includes steerable front wheels 22, an d steerable rear wheels 24. Steps 26 lead to an operator's station 30 having a steering mechanism 32 to steer the harvester 10. Placed generally intermediate of the front wheels 22 and rear wheels 24 are the shaker brushes 14 (only one illustrated) pivotally attached to a frame 12 of the harvester 10. The frame comprises a plurality of rigid frame members, such as 12. These frame members and other frame members illustrated in FIGS. 1–11 provide the host frame to which the shaker brushes, the conveyors, the prime mover (not shown), and other operating equipment for the harvester 10 are attached.

The shape and profile of olive trees is on the order of eight feet wide and ten feet high. The harvester 10 can accommodate a tree of at least this size passing through the harvester. The shaker brushes are placed in position to profile an olive tree by the use of the feeler springs in order to facilitate removal of olives.

In FIG. 1 the front steerable wheels 22 are steered through linkage 34 operated by a hydraulically powered steering system responsive to steering inputs by the operator. Rear steering is accomplished using back end steering linkage 36 carried on the vehicle frame 12 at the back end of the vehicle. Hydraulic cylinders 40 are used to provide steering output after input from the operator at his station 30. As will be discussed further on steering input to the back end of the vehicle may be automatically initiated by control signals from a control module.

In FIG. 2 the shaker brush assembly illustrated includes a plurality of flexible rods or tines, such as 16 that are attached to a central substantially vertical shaft 42 as is known in the art. A plurality of cantilevered leaf spring feelers such as 20 are carried on a vertical shaft 44 which is offset from the shaft 42 carrying the shaker rods 16. The feeler spring shaft 44 is pivotally supported on supports or members 46 and 48 which are cantilevered away from and attached to shaker brush frame member 50. In one embodiment, the shaft 44 carrying the spring feelers 20 is located in a position such that it leads, relative to forward travel of the harvester, the center shaft 42 of the shaker brush assembly 14. A force balanced shaker drive system is contained in housing 52. The flexible shaker rods, such as 16, are connected to the central shaft 42 as is known in the harvester art. These flexible rods are vertically spaced to form levels or rows of rods.

The verticality of the brushes is within a broad range. In a preferred embodiment the brushes will be generally vertical but it is expected that other embodiments of the invention can incorporate brushes that are out of vertical by a significant amount. This would be in the range of, but not limited to, five to twenty degrees from vertical.

A force balanced shaker drive reaction arm 54 is connected to upper portion of the shaker brush assembly. The arm 54 has a middle portion that angles upwardly from the end of the arm. This end of the arm is connected to the frame 12 of the harvester 10. The other end of the arm extends horizontally to where it is connected to the shaker drive motor 58. The shaker drive motor is rigidly coupled to the shaker drive shaft 68.

The brush rods 16 may be oriented at a ninety-degree angle relative to the central shaft 42, or slightly offset at a vertical or horizontal angle if desired. The spacing distance between adjacent rods is configured to optimize the engagement of the shaker brushes 14 with the tree profile for efficient olive harvesting. The spring feelers, such as 20, assist in guiding the shaker head 14 into the tree by contacting the tree and assisting in determining the general profile, shape or contour of the tree.

The springs or feelers, such as 20, are cantilevered from their support shaft 44. The mounting apparatus for mounting the spring feelers is an adjustable collar 56, the collar being a split ring attached to a spring attachment plate, that fits over the support column 44. The springs 20 and associated mounting collars, such as 56, can be individually rotated and clamped to the center pivot rod or column 44. These feelers are located at approximately a ninety-degree angle relative to the support column 44 in a horizontal plane. The feelers are spaced vertically above or below each other so that there are enough feelers to contact the tree at multiply places. The feelers 20, referred to herein as springs, spring feelers, or feeler springs, are resilient but stiff enough to generate a torque load on their support column 44 when the feelers 20 are "brushing" against a tree.

The length of the feelers, such as 20 depends on the shape of the trees to be harvested. As shown in FIG. 2, the springs or feelers 20 at the upper part of the tree are usually longer than the lower feelers that will contact a broader portion of the tree. The individual feelers 20 can be replaced with different length feelers (items 20 are shown as three different lengths) that are either shorter or longer than the removed one depending on the expected tree profile. For example, feelers 20 designed for a conical shaped tree profile, wherein the feelers toward the top of the shaker brush are for sensing the top of the tree, are longer than lower feelers, which will contact the wide part of the tree, can be replaced with a full set of shorter feelers for a hedgerow shaped, generally straight sided or vertical profile. The spacing distance between adjacent feelers, such as 20 is set to optimize the engagement of the shaker brush 14 into the tree profile. The horizontal optimum distance between each feeler is determined empirically but would be approximately eight to eighteen inches.

Figure 3:
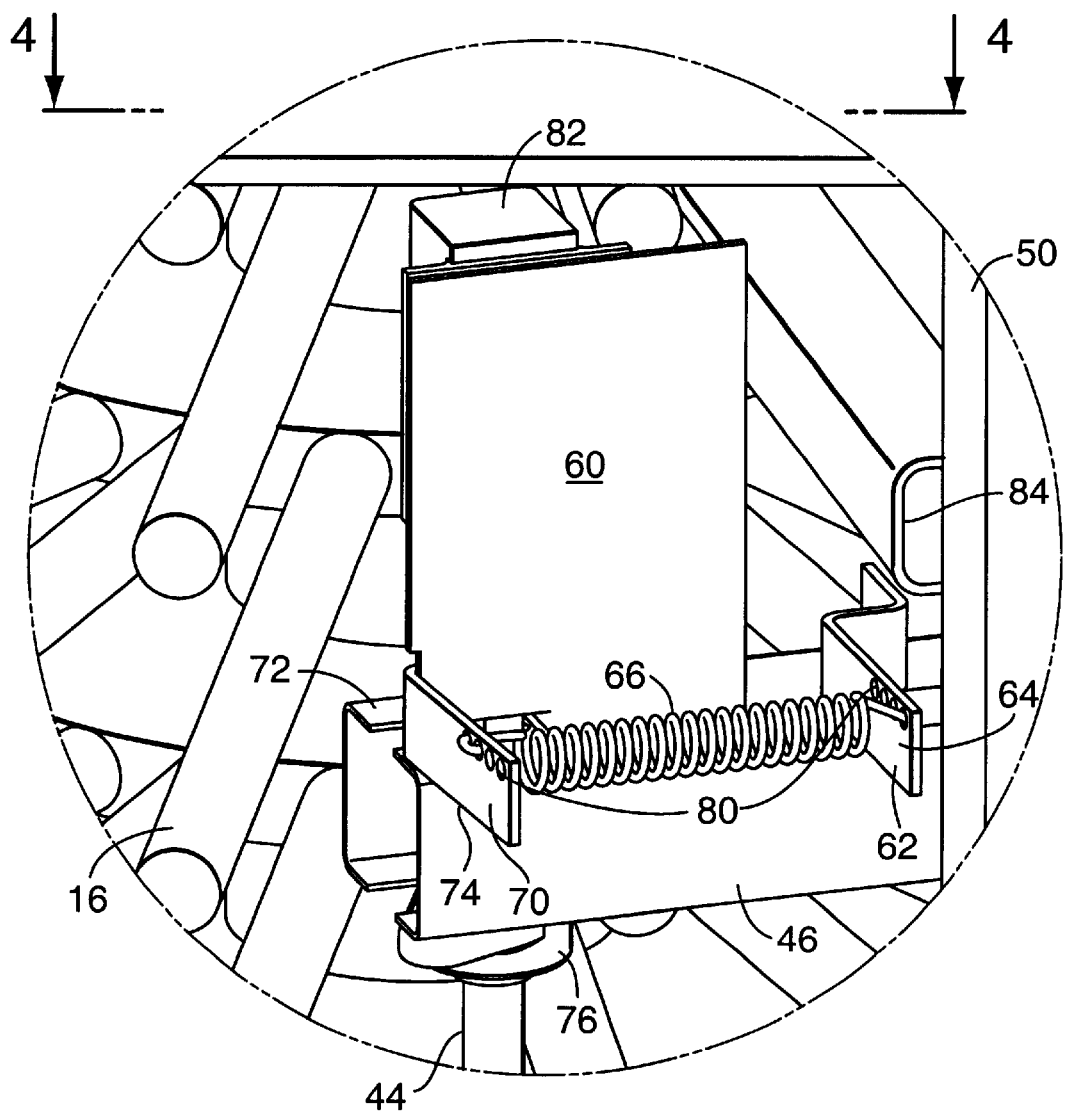
FIG. 3 is a side view of the anchor spring from an upper portion of FIG. 2.

FIG. 3, which is the content of the FIG. 2 drawing in the circle identified as "3," shows the rod or spring feeler support column 44 connected to a slotted tube previously identified as a support 46. The support 46 also supports a plate 60. A spring anchor 62 is Z-shaped piece of flat stock having a spring connection end 64 that extends out from the side of the support 46. The spring anchor 62 is fastened to the support firmly. A spring 66 is connected at one end to the spring anchor at 64 and at a second end to a movable tab 70. The tab 70 is another Z-shaped piece of flat stock similar to anchor 62 but it is not fastened to the support 46. It is firmly affixed to the shaft 44 for the feeler springs and will move with that shaft, resisted by the spring 66.

Also shown in FIG. 3 is the shaft 44 and the rods such as 16. The shaft 44 is restrained from downward vertical movement by the interface of the movable tab 70 contacting the top surface 72 of the support 46. The bottom edge 74 of the movable tab 70 will be the contact surface for the tab 70. The tab 70 is attached to the shaft 44 however that connection is not visible in FIG. 3.

A bearing 76 locates the shaft 44 for the feeler springs 20 at an upper support 46.

It should be noted that the spring anchor 62 and the movable top 70 are provided with holes such as 80 that allow spring 66 to be attached in different locations. Moving the spring attachment or anchoring will result in a degree of tension adjustability.

A potentiometer, as represented by housing 82, is shown in this figure in line with the end of the feeler spring shaft 44.

Item 84 is the end of a support that supports and stabilizes the upper end of the central shaft 42. More about this support will be described below.

Figure 4:
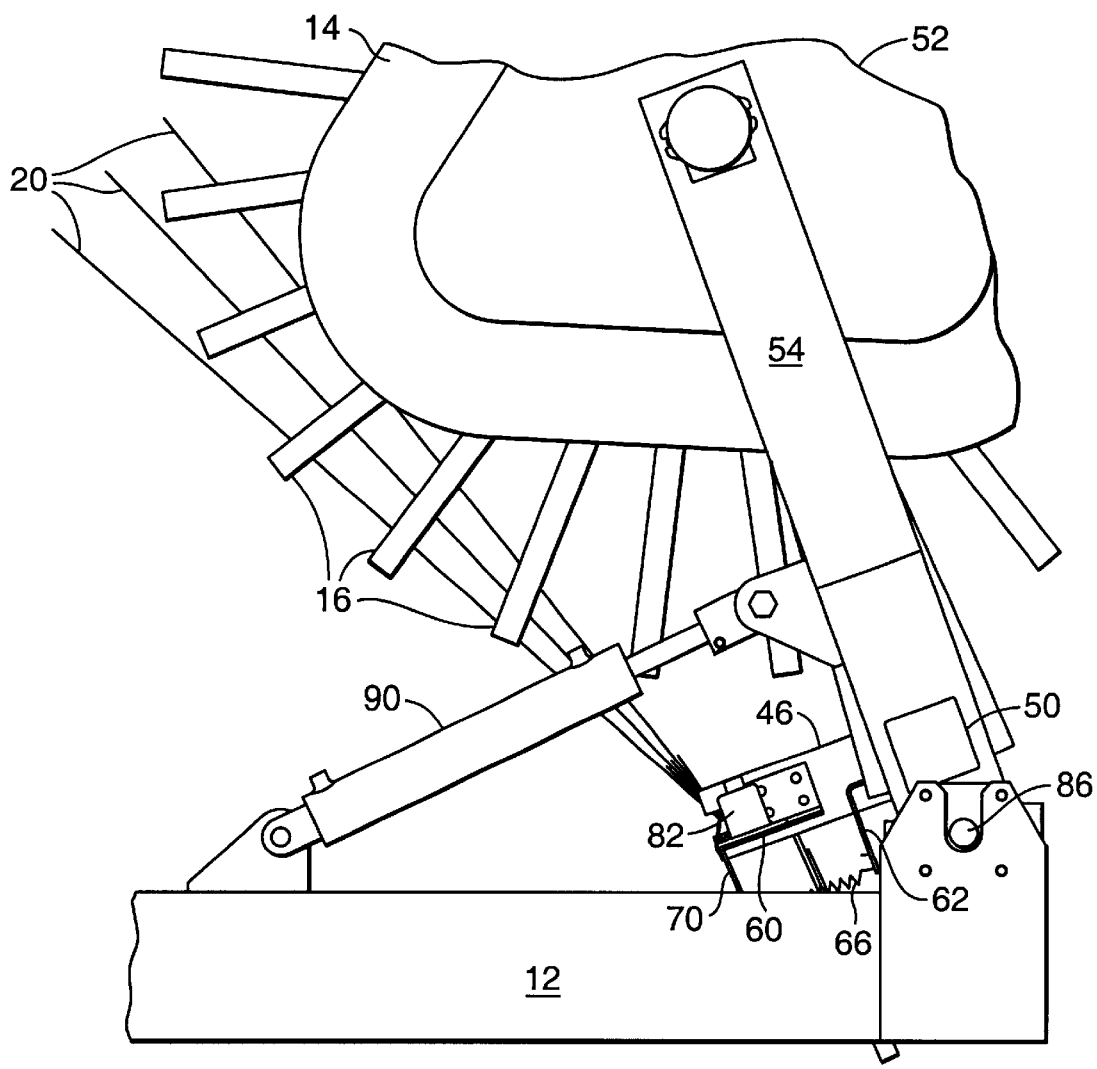
FIG. 4 is a top view of the shaker element of FIG. 1.

FIG. 4 is helpful in recognizing the placement of the elements shown in FIG. 3. The force-balanced shaker housing 52 hides part of the rods such as 16 that emanate from the central shaft.

The feelers or springs 20 are clearly shown in this version as having different lengths and different angular rotation or position on the shaft to which they are mounted. However, spring length is a variable that is selected based on picking effectiveness dependent on tree shape. The springs 20 are mounted to the shaft 44. The shaft is hidden under the potentiometer housing that is mounted to plate 60. This plate is mounted to upper support 46. Spring anchor 62 is also mounted to the support 46 and the other end of spring 66 is affixed to movable tab 70 which will move with the shaft 44 as the tab 70 is fixedly attached thereto.

The upper support 46 is attached to the wall of the tube 50, also referred to as the shaker brush frame member, and will move with it.

The entire shaker brush assembly will pivot around point 86. The arm 54 at the top of the shaker brush above the force-balanced shaker 52 is primarily a resisting stabilizer that resists the force balanced shaker motor drive torque. It is not used as the upper support for the central vertical shaft 42. That function is related to the brush shaft support 84 and will be discussed below.

Also shown in FIG. 4 is hydraulic cylinder 90 which is pivotally attached to a portion of frame member 12, at the piston end of the cylinder. The rod end is pivotally attached to a structural element other than the arm 54. This cylinder 90 will "extend" and "retract" the shaker brush 14 responsive to signals sent to the hydraulic valve system by the controller responsive to the spring feeler input, override limit controls or operator override controls. The hydraulic cylinder will be plumbed to a hydraulic pump and source of fluid pressure and flow through suitable hydraulic lines (not shown).

The operation of the tree locating spring feelers is as follows. The feelers 20, when in contact with a tree, will generate a torque load on the shaft 44. The torque input of one feeler 20 engaging a tree causes relatively little shaft 44 rotation due to the resistance of the spring 66. However, engagement of several feelers 20 will cause an additive torque effect with resultant greater torque effect on shaft 44. The shaft 44 will then rotate a greater degree causing the anchor spring 66 to be stretched beyond its preload setting. The potentiometer will generate a signal responsive to shaft 44 rotation. As an alternative, the potentiometer may be side mounted with a suitable belt or chain drive (neither being illustrated) to cause a shaft from the potentiometer to rotate in direct proportion to rotation of the shaft 44 in response to torque on the spring feelers. Another alternative is to use a linear motion potentiometer or slide potentiometer for sensing the degree of support shaft rotation.

The rotation of the shaft 44, to which the feeler rods are attached, causes a signal to be sent to an electronic controller located on the vehicle, most usually in the operator's workstation. The electronic controller in turn causes the extension or retraction of the hydraulic cylinder 90, powered by a hydraulic pump remote from the cylinder and appropriately plumbed thereto, to move the shaker head in or out relative to the centerline of the harvester. Repositioning the shaker brush 14 drives the potentiometer 82 error signal toward zero. This repositioning establishes a new equilibrium point that helps determine whether the shaker 14 needs to be adjusted in response to different tree profiles.

In summary of the invention to this point, the harvester employs a method of positioning a shaker head of the harvester relative to the frame. The shaker head includes a shaker brush frame, a rotatable feeler spring shaft, a feeler spring supported on the rotatable feeler spring shaft, a sensing device associated with the rotatable shaft for the feeler springs, a controller having signal receiving and signal generating systems, and an adjustable link carried between the shaker brush frame and the frame of the harvester. The method of shaker head positioning includes the acts of: moving the feeler spring; sensing movement of the feeler spring; generating an input signal corresponding to the sensed movement of the feeler spring or at the feeler spring shaft; receiving the signal at the controller; and generating a signal at the controller and sending the signal to the adjustable link. In one embodiment of the invention, the sensing of the movement of the feeler spring is done by sensing an "average" movement of the feeler spring shaft caused by engagement of one or more than one of the attached feeler springs.

If a tree is off-center due to a steering error or poor alignment of the harvester relative to tree, the shaker brushes will both move to accommodate the actual position of the tree. It is contemplated that the system can be fine tuned to have only one brush move in this situation but the preferred embodiment is to move both the left and right side brushes independently depending on sensed errors. A "time-out" feature is incorporated in the shaker head position control system. If the harvester is driven away from the tree row and there are no trees to engage the feelers there is no reason to keep the system in an active mode. In an active mode the system will be biased to retract the hydraulic cylinders and move the shaker heads as far inward as possible. When there is a lack of torque on the feeler spring shaft 44 there will be a constant error signal. If this signal is present for more than a set time, e.g. ten seconds, the control system will send a signal to a hydraulic control valve and the hydraulic pressure to the cylinder is cut off. Basically, the time out feature automatically turns the shaker head control system off when control of the shaker head position is not needed. As a result hydraulic pressure and flow to and from the control valves, hydraulic hoses and actuators for the shaker head will be curtailed.

Whenever the error signal computed by the control system indicates a need to change from "retract" to "extend," the control system is automatically restarted. This automatic engagement of the shaker brushes reduces wear and tear of the harvester 10. A further benefit of the time out feature and automatic restarting is that the operator of the harvester is not required to turn the system on or off as he drives into and away from contact with rows of crop due to the automatic restart feature of the invention.

Figure 5:
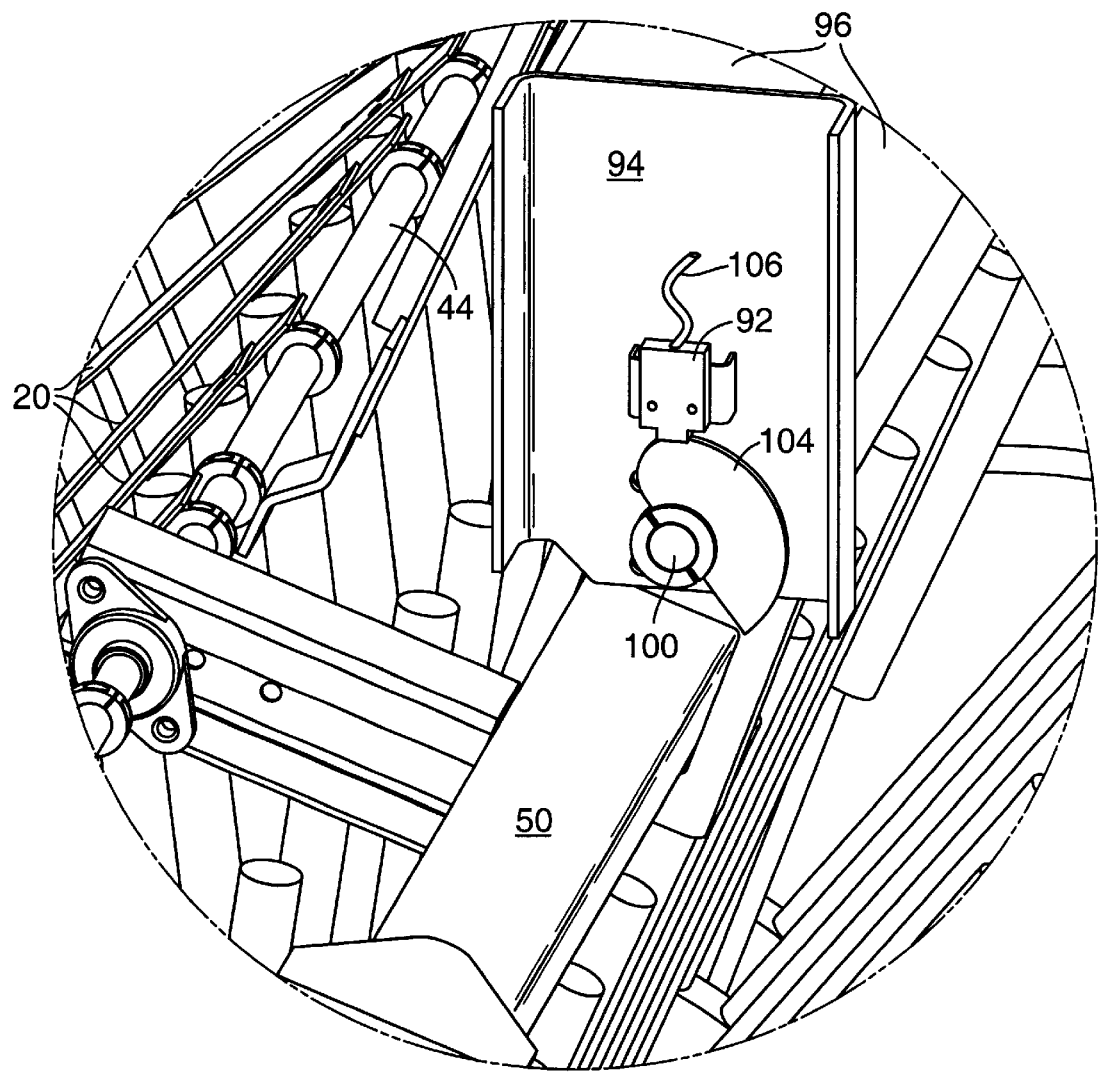
FIG. 5 is a side view of a limit switch associated with the shaker of FIG. 1.
Figure 6:
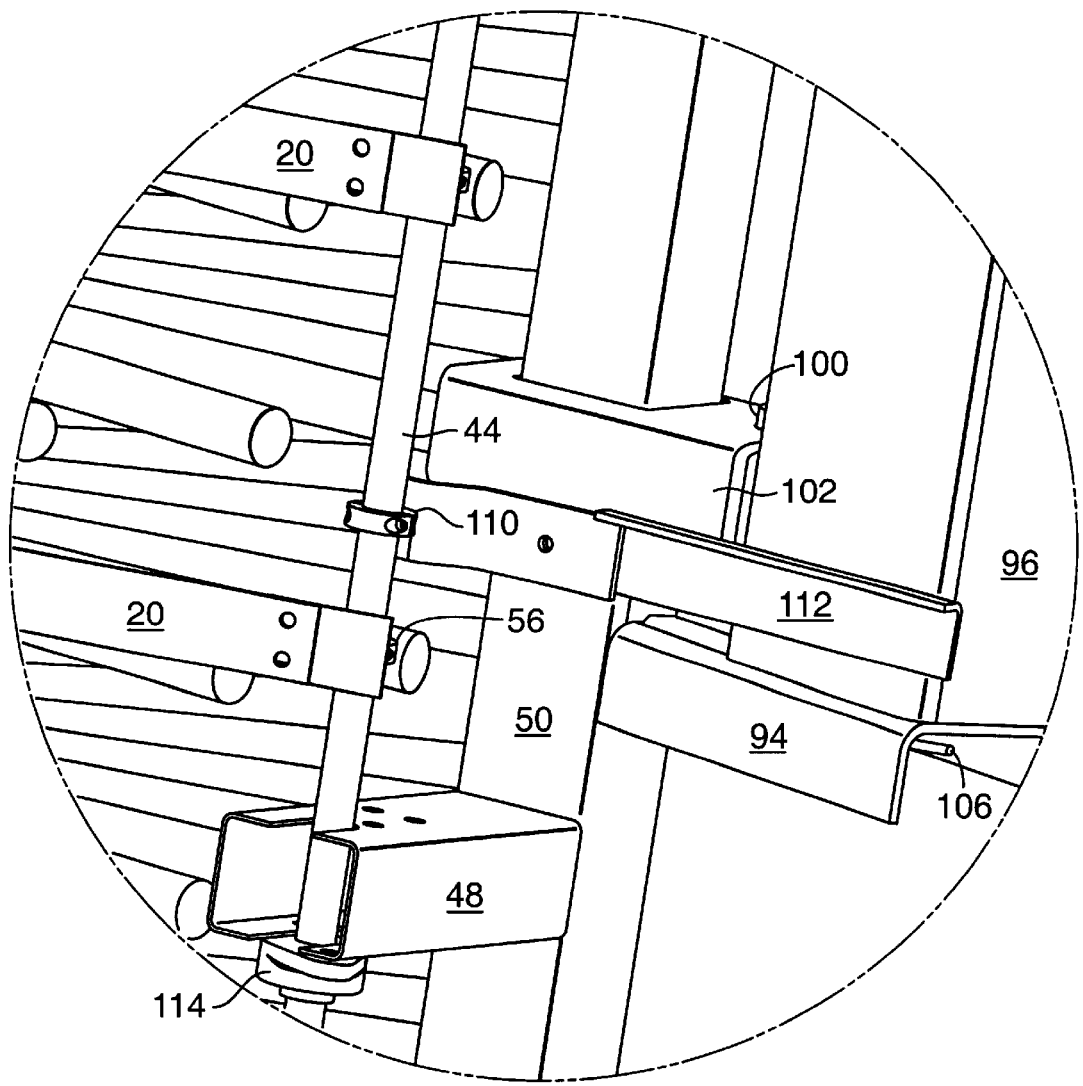
FIG. 6 is a mechanical stop associated with the shaker of FIG. 1.

FIG. 5 and FIG. 6 show two embodiments of feeler spring and shaker brush travel limiting solutions. The purpose of the limit apparatus is to prevent the rods 16 from one set of brushes from getting too close to the set of rods of a second shaker brush. The rods can be separated by a preset value such as eight to ten inches from each other by either of these shaker head travel limiting solutions.

FIG. 5 shows one embodiment. It includes a limit switch 92 mounted on the bottom of a horizontal channel 94 which is attached to the lower end of the major support member 96. It should be pointed out that the major support member 96 descends down from the frame 12. It is a large box structure beam that supports the shaker brush 16 through the shaker brush member 50 which is pivotally mounted to the major support member. The pivot shaft is item 100 in FIGS. 5 and 6. This shaft 100 is fixed to the shaker brush frame member alignment support 102 and can rotate in a bore in the horizontal channel 94. Returning specifically to FIG. 5, a cam 104 is mounted on the pivot shaft 100. The rotation of the pivot shaft rod and cam 104 trips the limit switch 92 at a predetermined displacement. The limit switch 92 is connected by electrical conduit 106 to an input for the controller, also known as the control system module.

In FIG. 5 the shaker brush is in a partially extended position as shown in FIG. 4. As the shaker brush 14 is retracted the frame member 50 will rotate or travel more inboard and eventually limit switch 92 will be triggered and send a signal to the controller to stop movement by closing a supply valve to the hydraulic cylinder 90.

The feeler springs 20 for engaging the tree are shown in FIG. 5. If the shaft for the feelers 44 does not rotate due to the lack of engagement of the feelers 20 with a tree profile, the shaker heads will retract as the potentiometer 82 will indicate no shaft displaced and the controller will attempt to bring the shaker brushes inboard to "find" a tree. The limit switch 92 is used to interrupt the retract signal at a preset position to prevent the shaker head 16 from fully retracting, that is, beyond the need for harvesting or close to the other shaker brush. For road travel the limit switch 92 can be switched off and overridden from the operator's station. This allows the shakers 16 to fully retract to minimize overall width of the harvester when traveling or at rest.

The second travel limiting solution is shown in FIG. 6.

FIG. 6 shows a mechanical limit structure that operates through the feeler shaft 44. An adjustable collar 110 is affixed to one end of a sensor paddle 112. The sensor paddle 112 will move freely with shaft 44 until it contacts the major support member 96. It will, upon such contact, impose a torque load on the shaft 44, rotate the shaft 44 to affect potentiometer output at the end of the shaft (82 in FIG.4) to act as a surrogate input when there is no torque on the shaft 44 being induced by the spring feelers 20.

The sensor paddle 112 can be manually adjusted so that each shaker brush will not retract too far—not so far as to contact the adjacent/opposite shaker brush, for instance.

Also shown in FIG. 6 is the lower support 48 and its alignment bearing 114.

For road travel, the sensor paddle 112 may be rotated so that it will not contact the major support member 96. This will allow the shaker brushes 14 to fully retract to minimize the harvester width when traveling or when parked.

Mention of a controller has been made several times in the specification. The controller is a dedicated microprocessor that will receive inputs from several sensors and control several output options. One input to the controller is a voltage signal from the potentiometer 82. Another input could be from the limit switch 92. The input from these sources will be processed by the controller and various outputs, one example is the outputting of signals to the electric-over-hydraulic, solenoid operated valves for controlling the position of the shaker brushes 14 through the hydraulic cylinders such as 90.

The controller also will be used in the rear wheel steering control scheme as will be discussed further on.

The controller is not to be limited to these functions as microprocessors of this type are programmable to be very multifunctional. For instance, but without intending to be limiting, the controller can be used to control the height of the vehicle—it is elevatable on hydraulic rams at each wheel station of the harvester. The controller can also be used to control the height of the operator's workstation, the speed of the shaker brush drive system and various dash board indicators and lights as are necessary or informative for the operator.

The controller, with respect to shaker brush position, can be switched from an auto mode, the normal harvesting mode, to a jog mode. In the latter condition, the operator can use a jog switch to move and hold each shaker brush 14 at any desired position.

One example of harvester operation follows. The harvester 10 is driven down a row of olive trees to shake the trees at a magnitude and frequency sufficient for olives to be picked and fall onto the catch and recovery apparatus carried on the lower part of the harvester frame. For example, as depicted in FIG. 1, the operator need only to climb up the set of stairs 26 provided at the front of the harvester 10 and steer the harvester down a row of trees, steering the harvester to straddle the trees. One or more shaker brushes 14 are engaged with the branches of the trees and are able to determine, using the feeler springs 20 associated with each shaker head, the profile or the shape of the tree for optimum shaker engagement. Feeler springs such as 20 attached to the feeler shaft 44 and communicating with the control system, automatically repositions each shaker head 14 to properly engage the shaker rods 16 with a tree. See FIGS. 2–4. If no engagement with a tree is warranted the shaker brushes 14 are withdrawn toward the frame 12 of the harvester 10 to minimize its width for easier transport.

The harvester can also be equipped with a sensor system to help the operator in steering of the vehicle. The sensor system is an aid in steering the back end of the vehicle so that as the vehicle swings wide in turns it can be properly steered to avoid tree damage or other detrimental conditions caused by the rear of the vehicle not tracking the front of the vehicle.

Figure 7:
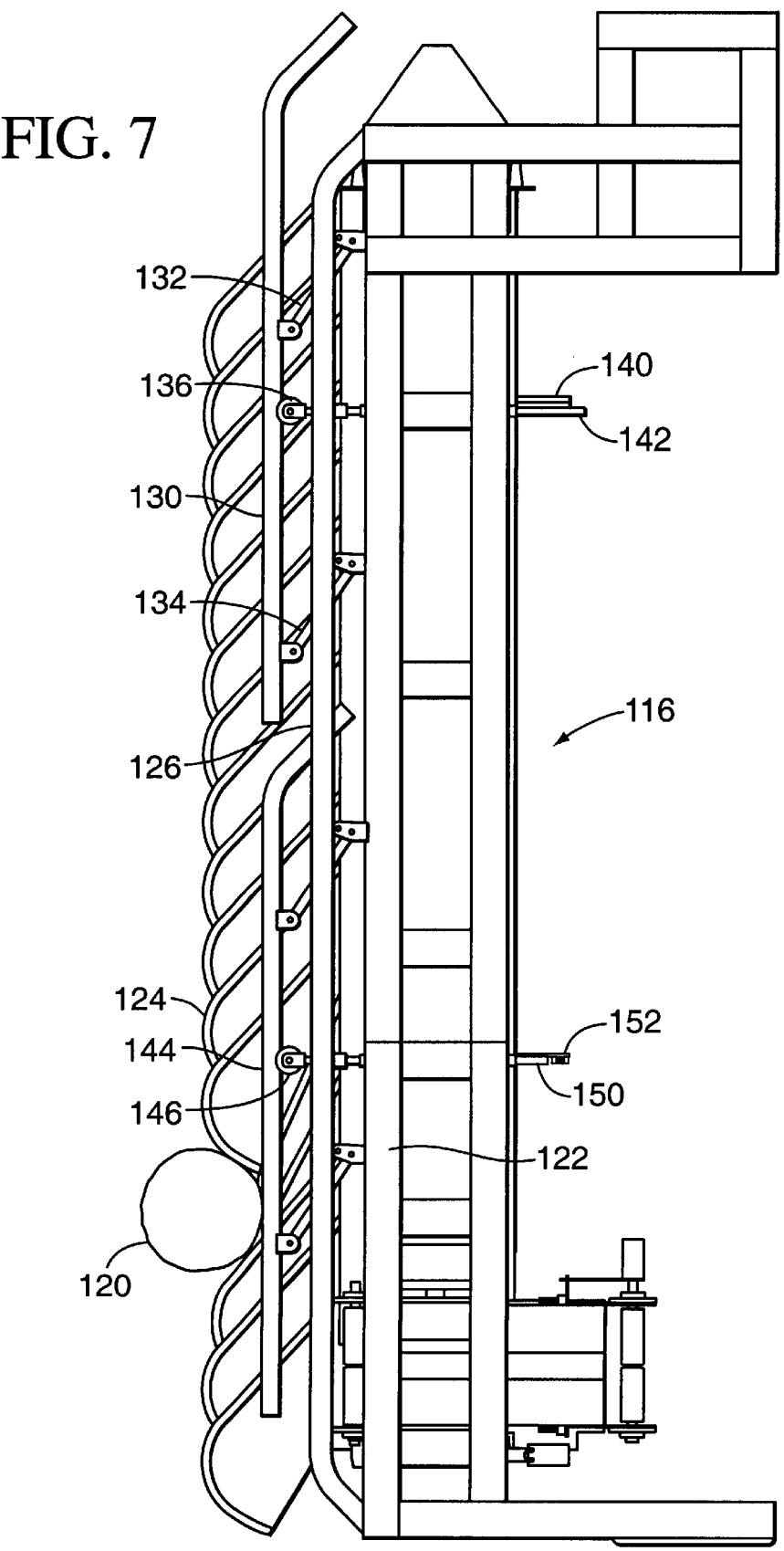
FIG. 7 is a side view of a pair of rear rail sensors of a harvester.

FIG. 7 is a bottom view of one side of the conveyor and olive gathering apparatus, generally 116, carried at the lower portion of the harvester 10. Direction of travel will be relatively upward in this figure. A mirror image comprising a right side conveyor and gathering apparatus would be installed on the harvester but has been left out of FIG. 7 for clarity.

An olive tree trunk is shown as 120. The tree trunk will be bracketed on the left and right by the apparatus 116 and the minor image unit on the other side. A longitudinal frame member 122 runs the length of the catch apparatus 116. This frame member 122, as well as others, supports the conveyor system, the pivotal flaps 124, a guard bar 126 as well as other apparatus.

A linkage supported front rail 130 is carried by parallel links 132 and 134 on the frame member 122. The front rail is spring biased by roller contact 136 and biasing rod 142 to move outboard relative to the frame member 122, toward the center of the harvester which is toward the trees. As this front rail 130 is displaced toward the frame 122, responsive to contact with an obstruction such as a tree, a sensor associated with the front rail will indicate to the controller that the harvester is being driven off a proper path, too close to a tree or otherwise in an undesirable direction. The sensor, a first linear potentiometer, pictorially represented as 140, is associated with biasing rod 142. The biasing rod 142, with the roller 136, is spring loaded by means of a spring (not shown) behind a frame member to urge the front rail 130 toward the center of the vehicle. The position of the front rail 130 will be sensed by the linear potentiometer 140 and a corresponding signal sent to the controller. If the front rail 130 is being deflected by a tree, post or other impediment, a signal will be sent to the operator informing him that a steering correction is required. Alternatively, an automatic steering correction could be made by the controller sending a signal to activate a steering valve for the harvester front wheels.

The back end of the harvester 10 also has steerable wheels. An improvement to existing harvesters is to have the rear wheels automatically steered in response to the sensing of a back end steering deviation. In FIG. 7 a linkage supported back rail 144 is mounted similarly to the mounting of the front rail addressed above. A shaft mounted roller 146 is carried at the end of a spring loaded shaft 150 that will bias the back rail 144 toward the centerline of the harvester. The second linear potentiometer 152 will sense the position of the shaft and thus the back rail 144. If a significant, out of tolerance deflection is sensed, the signal from the potentiometer 152 to the controller will be processed and send a signal to the operator, such as a light on the dash, instructing that a rear steering correction is needed and showing which direction a correction should be made. In another embodiment, the controller can be programmed and set to deliver a signal to the back end steering system control valves.

Figure 8:
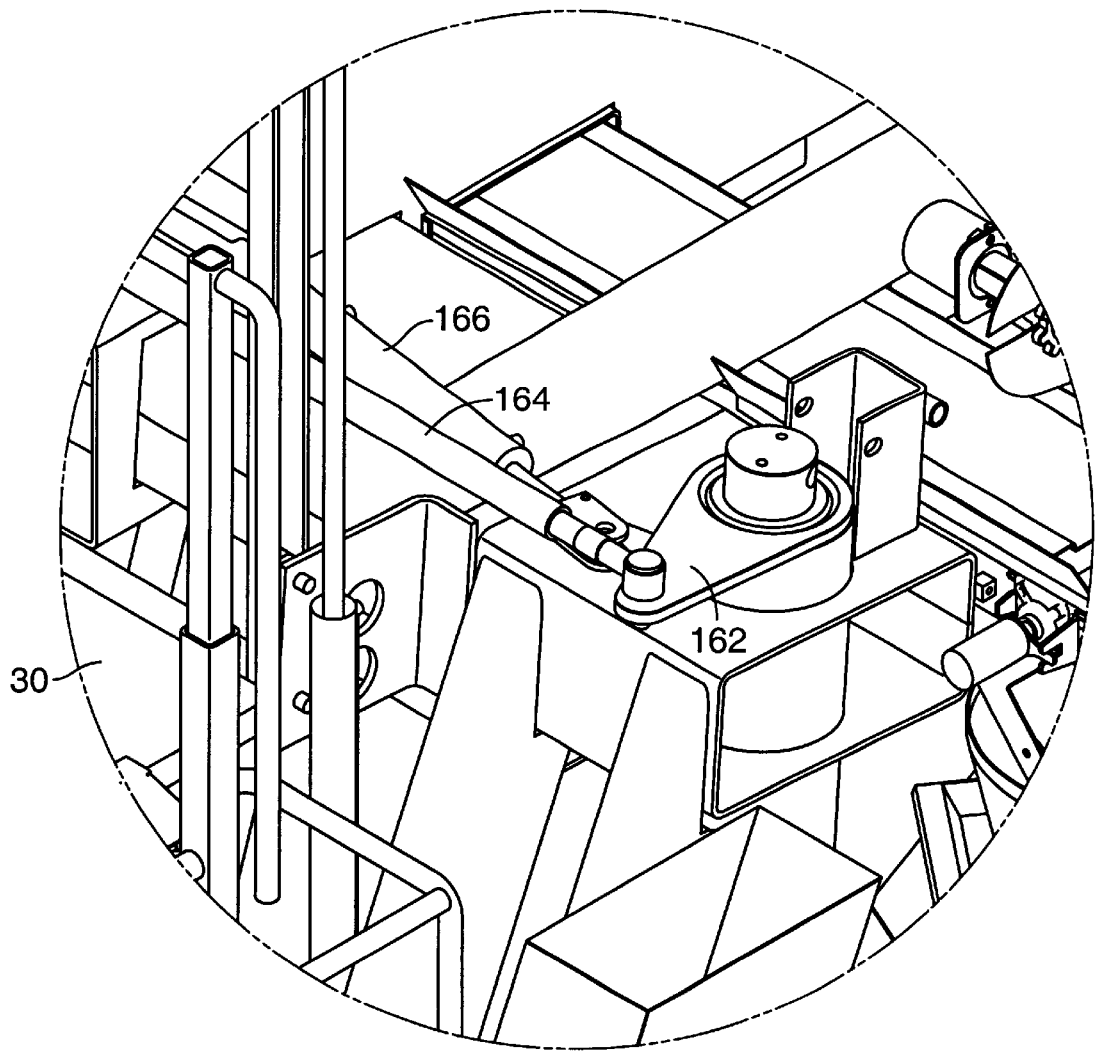
FIG. 8 is a view of a portion of the steering actuator for the front wheels of the harvester shown in FIG. 1.
Figure 9:
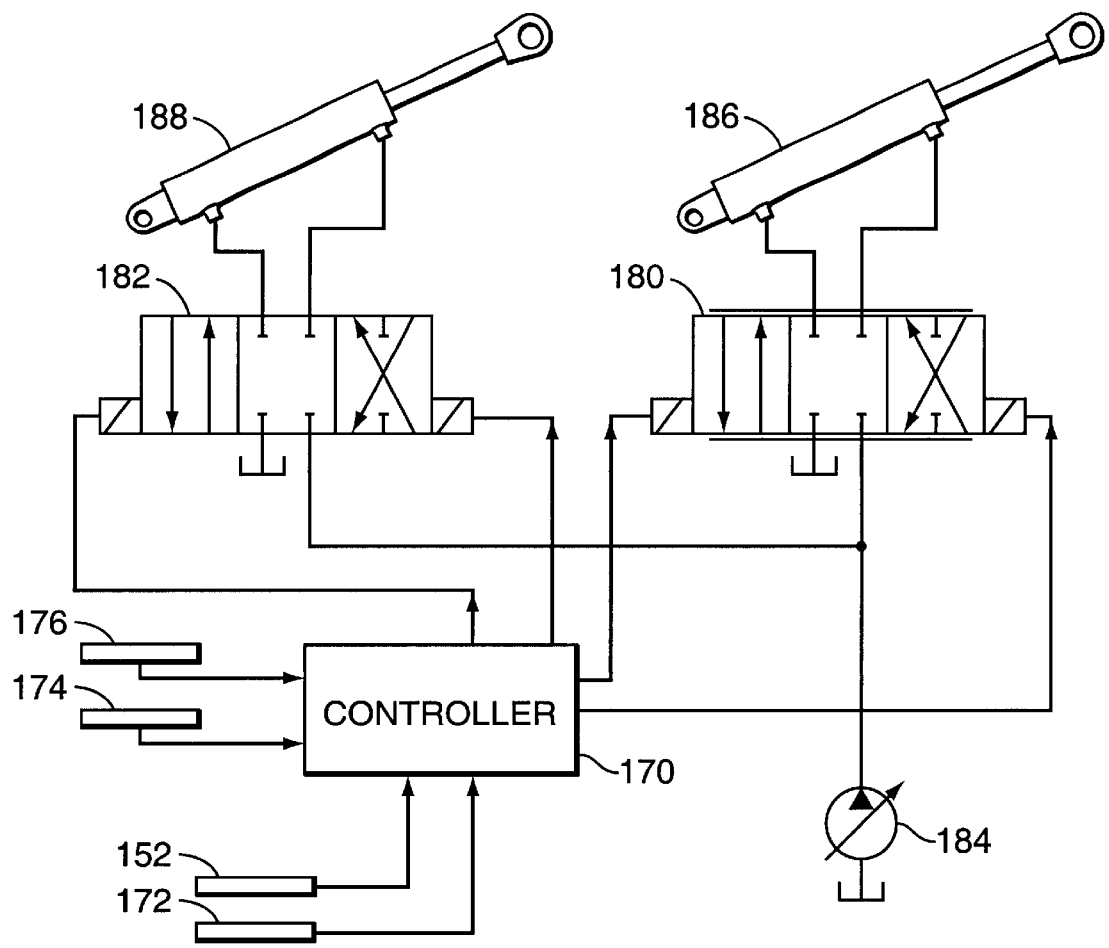
FIG. 9 shows a schematic of an automatic steering correction system.
Figure 10:
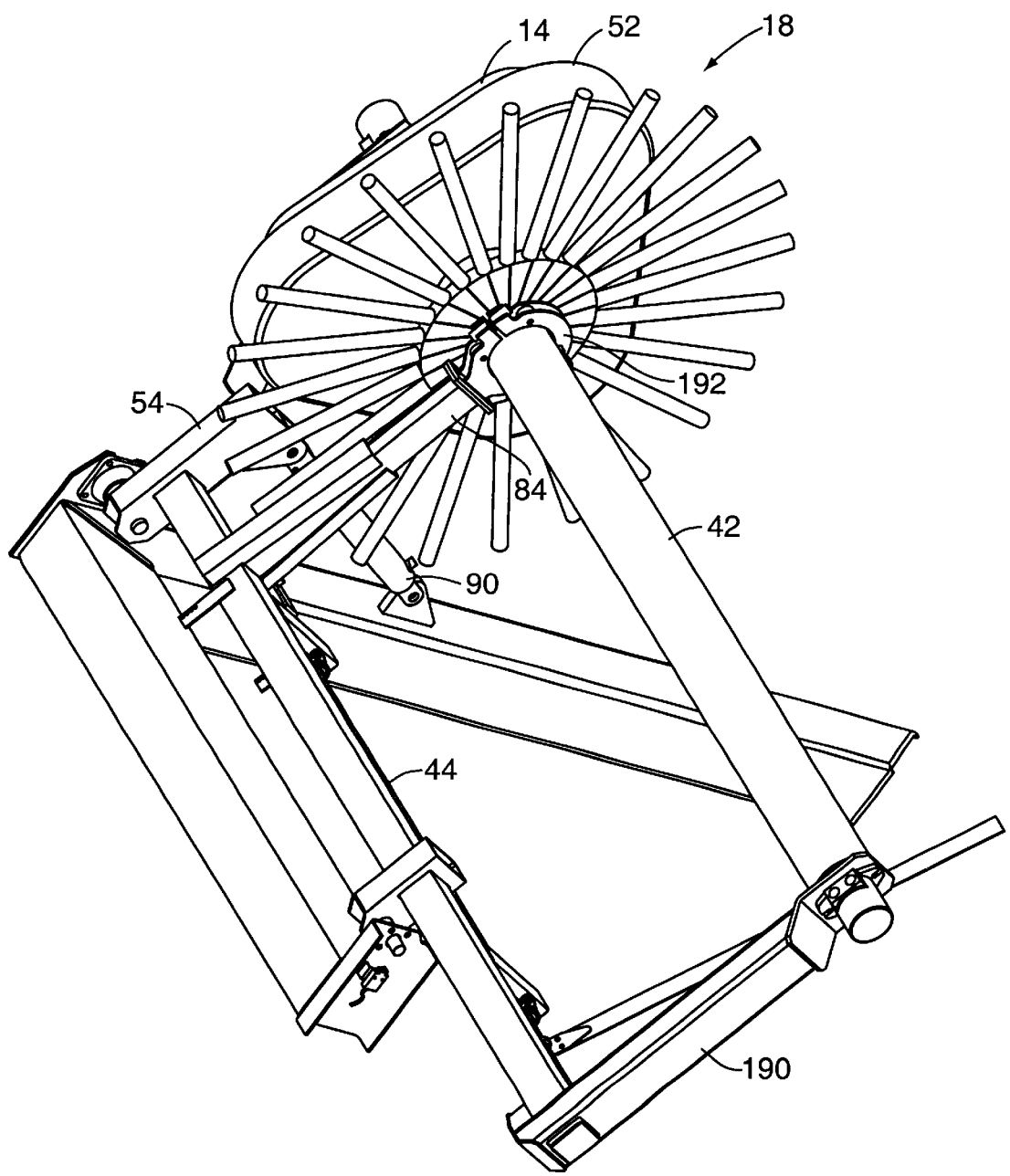
FIG. 10 is a view showing the shaker brush support at the top of the shaker brush with several rows of shaker brush rods removed for clarity.
Figure 11:
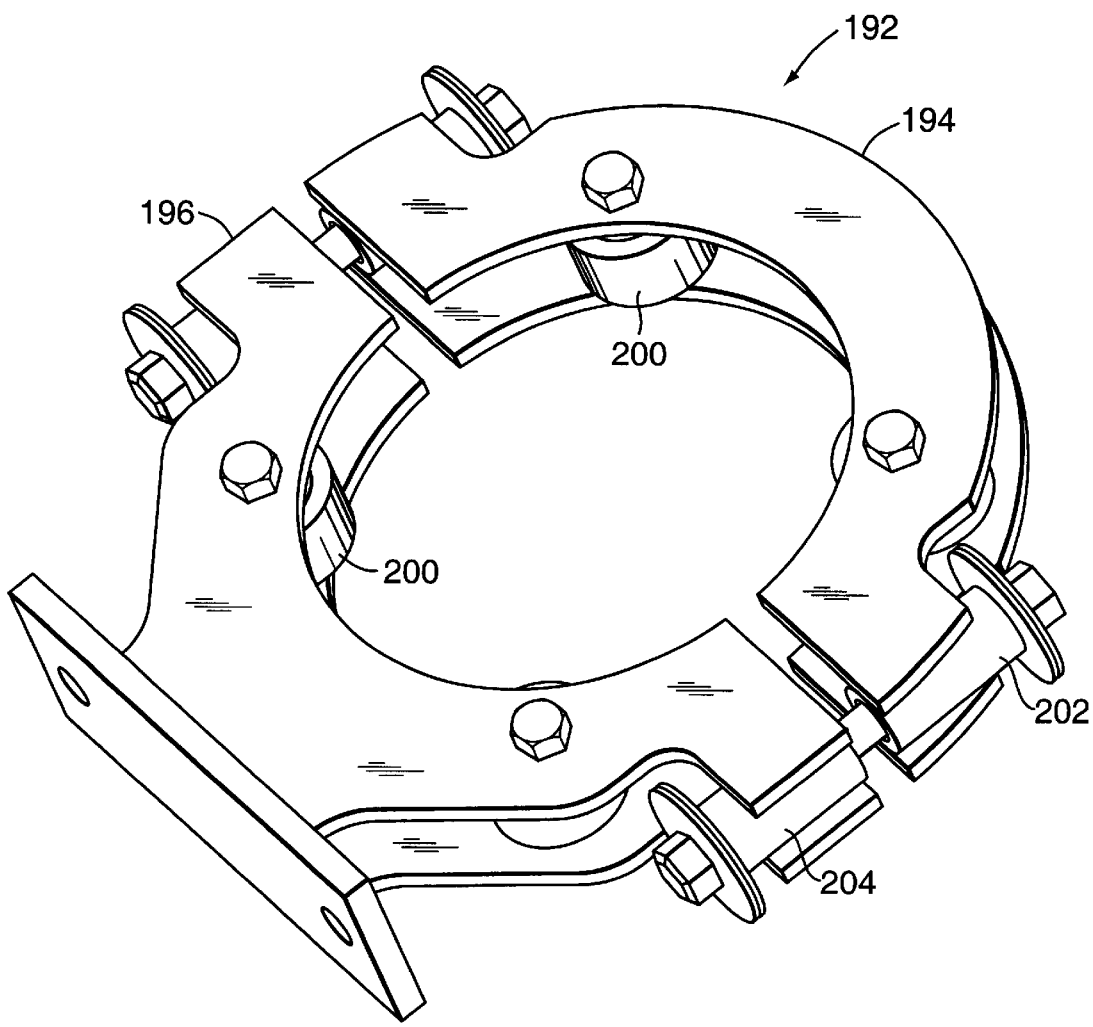
FIG. 11 is a close up of the split clamp used to support the upper end of the shaker brush.

FIG. 1 in conjunction with FIGS. 8 and 9 illustrate the automatic rear steering embodiment. Looking first at FIG. 1, the back or rear steering hardware can be seen. The cylinders 40 will both be used to steer. They will urge the pitman arms 154 and 156 to rotate the vertical uprights clockwise or counterclockwise depending on which steering valves are activated. A tie rod 160 serves as an equalizer. The actual valving, hydraulic pump, reservoir and necessary hydraulic conduct and electrical conduit are not shown as they are known in the art. FIG. 8 provides a closer view of the steering mechanism. It is virtually the same as the rear steering apparatus with a pitman arm 162, a tie rod 164 and a steering cylinder 166. Not shown in FIG. 1 or 8 is a linear motion detecting potentiometer, or the like, carried inside or outboard of at least one of the steering cylinders, or tie rods, at each end of the vehicle. Such device would indicate electronically the static and dynamic position of the steered wheels at the respective ends of the harvester and convey that information to the controller.

In FIG. 9, the controller, a programmable microprocessor that may be equipped with onboard valve driver amplifiers, will receive various inputs from, for instance, a left side second linear motion potentiometer 172, not shown in the other drawings figures, and will be electronically connected to the controller 170 as shown. Another sensor input to the controller 170 is the steering activator master position sensor 174 that is associated with the front steering linkage as discussed above. A further sensor will be the rear steering activator slave position sensor 176.

The controller 170 will provide electrical control signals to both the front steering valve 180 and the rear steering valve 182. These valves are conventional solenoid operated three position hydraulic valves, either on/off, or proportional, which receive fluid flow from a pump 184. Appropriate steering motors, such as cylinder 186 for steering the front wheels and cylinder 188 for steering the rear steering wheels are shown in FIG. 9

In one mode of automatic steering, when an error signal is received from the rear position sensors 152 or 172 (linear motion potentiometers), the signal processed through the controller 170, overrides the current control and signals a rear wheel actuator or steering motor 188 to reposition rear wheels 24 to drive the rear position signal from the linear potentiometers 152 or 172 toward zero. When this condition is met, a conventional master/slave steering relationship or manual rear steering is automatically resumed.

The steering system performs with an automatic coordinated four-wheel steering arrangement. The system can work equally well with manual two wheel, four-wheel, or crab type steering system. The automatic priority rear wheel correction activated from the second linear potentiometers associated with the position of the rear rails is representative of one aspect of the invention.

In summary, this steering correction aspect of the invention is incorporated in a harvester having two pairs of steerable wheels, each pair of steered wheels has a sensing device for determining the position of the steered wheels and a hydraulic circuit including valve systems for steering the harvester. One improvement in the harvester incorporates a system including a linkage supported rear rail carried by a frame of the harvester; a sensing device sensing the lateral position of the rear rail; and a controller responsive to a sensed signal from the sensing device. In this system the controller will cause the hydraulic circuit valve system to position the pair of steerable wheels so that the sensing device sensing the lateral position of the rear rail indicates that the rear rail is in a predetermined position. The method of doing this is accomplished by carrying out the following steps: (a) sensing the position of the linkage supported rear rail; (b) sending the sensed position of the rear rail to the controller; (c) determining, in the controller, if a steering correction is necessary; (d) sending a signal to the steering system; (e) sensing the position of the steerable wheels; (f) determining, in the controller, if a steering correction is necessary; (g) repeating acts (a) through (f) until the controller determines that a steering correction is not necessary.

The harvester presented herein includes stabilized shaker brushes or shaker heads 14 that are mounted so that access to the force balanced shaker 52 is not impeded or hampered. As shown in FIG. 2 the shaker brush assembly, generally 18, has a central shaft 42. This shaft is supported at its lower end on arm 190 which is securely attached to the end portion of the box section tubing shaker brush frame member 50. At the upper portion of the central vertical shaft 42 there is a brush shaft support having an end 84. This support is fixedly attached to the upper portion of the shaker brush frame member 50. As shown more clearly in FIGS. 10 and 11 a clamp 192 is positioned around the central shaft 42. The clamp 192 is a split clamp such that clamp half 194 is removably attached to clamp half 196 which is fixedly mounted to the brush shaft support 84. The clamp 192 supports the shaft 42 by cam bearings 200 carried by each half of the clamp 192. The clamp 192 is not necessarily a precision fit around the central shaft 42. It is secure but the clamp halves can be semiflexably held together by bolts passing through the attachment bosses such as 202 and 204 which could incorporate a spring-like distance piece, such as a belleville washer, placed under an attachment bolt head or bolt nut, both shown, or even between the clamp halves at the attachment bosses (not shown). With this upper "stabilizer" used to stabilize the shaker brush in a vertical deployment it is not necessary to have a significant stabilizer at the uppermost end of the central shaft as was done in earlier harvesters of this type. With this improvement, access to the force balanced shaker, for routine servicing, does not require the removal of the shaker brush unit itself as was the situation with the prior devices.

In summary of this aspect of the invention, the support for the shaker brush includes a shaker brush frame comprising a shaker brush frame member; an arm attached to one end of the shaker brush frame member; a brush shaft support carried on the shaker brush frame member spaced apart from the arm at one end of the shaker brush frame member; a clamp, having an inside diameter, carried by the brush shaft support, the clamp having two halves fastened together; a plurality of friction reducing elements carried by the clamp, each friction reducing element having a contact point inside the inside diameter. This system will allow supporting the central shaft from the lower end thereof and supporting the central shaft in the shaft zone using the clamp.

Various of the features, subcombinations and combinations of this invention can be practiced with or without reference to other features, subcombinations and combinations of the invention, and numerous adaptations and modifications can be effected within the spirit of the invention. While particular embodiments of the invention have been shown and described, it will be obvious to those skilled in the art that changes and modifications may be made without departing from the invention in its broader aspects, and, therefore, the aim in the appended claims is to cover all such changes and modifications as fall within the spirit and scope of the invention and the following claims. For instance, a plurality of stepper motors can be used as sensors and actuators in several places in the apparatus. In addition, for instance, the feeler springs can be made of different materials such as various metals, plastics, fiberglass or other similar materials. Such design nuances are contemplated as being within the scope of the invention and intend to be covered by these claims.

What is claimed is:

1. A harvester shaker assembly comprising:
   a central shaft supported on the shaker assembly;
   a plurality of rods projecting from the central shaft;
   a rotatable feeler spring shaft supported on the shaker assembly;
   a plurality of feeler springs attached to the feeler spring shaft.

2. The invention in accordance with claim 1 wherein the rotatable feeler spring shaft is a shaft extending parallel to the central shaft.

3. The invention in accordance with claim 1 wherein the feeler springs extend beyond the ends of the rods projecting from the central shaft.

4. The invention in accordance with claim 1 wherein the feeler springs do not contact the rods.

5. The invention in accordance with claim 2 wherein the rotatable feeler spring shaft is connected to a position sensor.

6. The invention in accordance with claim 5 wherein the position sensor is an electrical position sensor.

7. The invention in accordance with claim 6 wherein the position sensor is a potentiometer responsive to the position of the rotatable feeler spring shaft.

8. The invention in accordance with claim 1 wherein the plurality of feeler springs include feeler springs of a first length and feeler springs of a second length.

9. The invention in accordance with claim 8 wherein feeler springs of the first length have a given width and are separated from springs of the second length on the feeler spring shaft by more than the width of the feeler springs of the first length.

10. The invention in accordance with claim 1 wherein the feeler springs include feeler springs having a first spring rate and feeler springs having a second spring rate.

11. The invention in accordance with claim 1 further comprising a shaker brush frame member.

12. The invention in accordance with claim 11 wherein the central shaft is supported on the shaker brush frame member.

13. The invention in accordance with claim 12 wherein the feeler spring shaft is supported on the shaker brush frame member generally offset from the central shaft.

14. The invention in accordance with claim 13 further comprising:
   a vehicle having a frame to which the shaker brush frame member is pivotally attached;
   a control unit capable of receiving sensor input signals and capable for sending control signals;
   a position sensor sending a signal to the control unit;
   an adjustable link mounted to the vehicle frame at one end of the adjustable link and to the shaker brush frame member at a second end of the adjustable link.

15. The invention in accordance with claim 14 wherein the adjustable link is adjusted in response to actuation signals from the control unit.

16. The invention in accordance with claim 15 wherein the position sensor is connected to the rotatable feeler spring shaft.

17. The invention in accordance with claim 16 wherein the rotatable feeler spring shaft comprises an elastically deformable restraint.

18. A method of positioning a shaker head of a harvester relative to a frame of the harvester, the shaker head having a shaker brush frame, a rotatable feeler spring shaft, a feeler spring supported on the rotatable feeler spring shaft, a sensing device associated with the rotatable shaft for the feeler springs, a controller having signal receiving and signal generating systems, an adjustable link carried between the shaker brush frame and the frame of the harvester; the method comprising the acts of:
   moving a feeler spring;
   sensing movement of the feeler spring;
   generating an input signal corresponding to the sensed movement of the feeler spring;
   receiving the signal at the controller;
   generating a signal at the controller and sending the signal to the adjustable link.

19. The method as set forth in claim 18 wherein the adjustable link is a hydraulic cylinder and the harvester includes a hydraulic system to allow the extension or retraction of the adjustable link.

20. The method as set forth in claim 19 further comprising a limit stop wherein the limit stop sends a signal to the controller.

21. The method of claim 20 wherein the controller will send a signal to the hydraulic system to stop the retraction of the hydraulic cylinder when the limit stop signal is received by the controller.

22. A harvester for harvesting fruit, the harvester having two pairs of steerable wheels, each pair of steered wheels having a sensing device for determining the position of the steered wheels, and a hydraulic circuit including valve systems, for steering the harvester, the improvement in the harvester comprising:
   a linkage supported rear rail carried by a frame of the harvester;
   a sensing device sensing the lateral position of the rear rail;
   a controller responsive to a sensed signal from the sensing device, whereby the controller will cause the hydraulic circuit valve system to position the a pair of steerable wheels so that the sensing device sensing the lateral position of the rear rail indicates that the rear rail is in a predetermined position.

23. The invention in accordance with claim 22 wherein the sensing device is a linear potentiometer responsive to the lateral position of the rear rail relative to the frame of the harvester.

24. The invention in accordance with claim 22 further comprising a sensor carried on the harvester to sense the steering direction of the steerable wheels.

25. The invention in accordance with claim 24 wherein each pair of steered wheels is associated with a sensing device to sense the direction of each pair of steerable wheels, the sensor output being directed to the controller.

26. The invention in accordance with claim 25 further comprising a linkage supported front rail.

27. A shaker brush frame comprising:
   a shaker brush frame member;
   an arm attached to one end of the shaker brush frame member;
   a brush shaft support carried on the shaker brush frame member spaced apart from the arm at one end of the shaker brush frame member;
   a clamp, having an inside diameter, carried by the brush shaft support, the clamp having two halves fastened together;
   a plurality of friction reducing elements carried by the clamp, each friction reducing element having a contact point inside the inside diameter.

28. The invention in accordance with claim 27 further comprising a shaker brush assembly carried by the shaker brush frame with one end of the shaker brush assembly supported on the arm and the shaker brush assembly supported by the clamp.

29. The invention in accordance with claim 28 wherein the shaker brush assembly includes a central shaft and the central shaft is supported by the clamp.

30. A method of supporting a shaker brush, the shaker brush including a central shaft having a lower end and having an upper end and a shaft zone between the lower end and the upper end, in a shaker brush frame, the shaker brush frame also including a bearing incorporating clamp supported on an arm attached to the shaker brush frame, comprising the acts of:
   supporting the central shaft from the lower end thereof;
   supporting the central shaft in the shaft zone using the clamp.

31. The method of claim 30 further comprising a force balanced shaker mounted to the shaker brush frame above the clamp attachment point in the shaft zone of the central shaft.

32. A harvester shaker assembly comprising:
   a central shaft;
   a plurality of rods projecting from the central shaft;
   a rotatable feeler spring shaft;
   a plurality of feeler springs attached to the feeler spring shaft;
   a spring connected to the rotatable feeler spring shaft and to the harvester shaker assembly for providing resistance to rotation of the rotatable feeler spring shaft.

33. A harvester having a shaker assembly for harvesting fruit, the harvester having two pairs of steerable wheels, each pair of steered wheels having a sensing device for determining the position of the steered wheels, and a hydraulic circuit including valve systems for steering the harvester and a shaker positioning hydraulic system; the improvement in the harvester comprising:

the shaker assembly having central shaft having a plurality of rods projecting from the central shaft;

a rotatable feeler spring shaft carried by the shaker assembly, the feeler spring shaft having a shaft rotation sensor for generating a signal;

a plurality of feeler springs attached to the feeler spring shaft;

a linkage supported rear rail carried by a frame of the harvester;

a sensing device sensing the lateral position of the rear rail;

a controller responsive to a sensed signal from the sensing device and from the sensed signal from the shaft rotation sensor, whereby the controller will cause the shaker positioning hydraulic system to position the shaker assembly responsive to the shaft rotation sensor of the rotatable feeler spring shaft and cause the steering hydraulic circuit valve system to position a pair of steerable wheels so that the sensing device sensing the lateral position of the rear rail indicates that the rear rail is in a predetermined position.

34. The invention in accordance with claim 33 wherein the shaker assembly comprising:

a shaker brush frame member;

an arm attached to one end of the shaker brush frame member;

a brush shaft support carried on the shaker brush frame member spaced apart from the arm at one end of the shaker brush frame member;

a clamp, having an inside diameter, carried by the brush shaft support, the clamp having two halves fastened together;

a plurality of friction reducing elements carried by the clamp, each friction reducing element having a contact point inside the inside diameter.

* * * * *